United States Patent
Croak et al.

(10) Patent No.: US 7,933,213 B1
(45) Date of Patent: Apr. 26, 2011

(54) METHOD AND APPARATUS FOR MONITORING AND RESTORING TIME DIVISION MULTIPLEXING CIRCUITS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 900 days.

(21) Appl. No.: 11/240,671

(22) Filed: Sep. 30, 2005

(51) Int. Cl.
*H04L 12/26* (2006.01)

(52) U.S. Cl. .......................... 370/248; 370/242

(58) Field of Classification Search .................. 370/241, 370/242, 244, 245, 248, 250, 252, 401, 249; 379/22, 23, 32.01, 32.02, 33; 375/224
See application file for complete search history.

(56) References Cited

U.S. PATENT DOCUMENTS

| | | | | |
|---|---|---|---|---|
| 5,272,700 A * | 12/1993 | Hansen et al. | ............... | 370/480 |
| 5,301,050 A * | 4/1994 | Czerwiec et al. | ............... | 398/30 |
| 5,425,067 A * | 6/1995 | Sano et al. | ............... | 378/125 |
| 5,608,728 A * | 3/1997 | Ulm et al. | ............... | 370/488 |
| 5,818,906 A * | 10/1998 | Grau et al. | ............... | 379/32.04 |
| 5,953,348 A * | 9/1999 | Barn | ............... | 370/480 |
| 6,195,415 B1 * | 2/2001 | Shimoda et al. | ............... | 379/22 |
| 6,466,548 B1 * | 10/2002 | Fitzgerald | ............... | 370/249 |
| 6,553,515 B1 * | 4/2003 | Gross et al. | ............... | 714/47 |
| 6,882,653 B1 * | 4/2005 | Kiuchi et al. | ............... | 370/401 |
| 2003/0235242 A1 * | 12/2003 | Fitch et al. | ............... | 375/224 |
| 2004/0022198 A1 * | 2/2004 | Weil et al. | ............... | 370/252 |
| 2004/0199351 A1 * | 10/2004 | Ott et al. | ............... | 702/108 |

* cited by examiner

*Primary Examiner* — Kwang Yao
*Assistant Examiner* — Andrew Lai

(57) ABSTRACT

A method and apparatus for proactively managing TDM circuits used in a packet network, e.g., a VoIP network, by allowing it to instruct a program to periodically test the health of all circuits catalogued in the TDM facility database are disclosed. If a circuit is found to be out of service, the present invention will trigger a maintenance action through the edge component of the VoIP network to reset the circuit and restore it to a healthy condition.

12 Claims, 4 Drawing Sheets

METHOD AND APPARATUS FOR MONITORING AND RESTORING TIME DIVISION MULTIPLEXING CIRCUITS

The present invention relates generally to communication networks and, more particularly, to a method and apparatus for monitoring and restoring Time Division Multiplexing (TDM) circuits in communication networks, e.g., packet networks such as Voice over Internet Protocol (VoIP) networks.

BACKGROUND OF THE INVENTION

Packer network service providers, e.g., VoIP network service providers, rely on a multitude of Time Division Multiplexing (TDM) circuits to reach Public Switched Telephone Networks (PSTN) endpoints. These TDM circuits are in the form of voice channels, such as DS0 channels, within a T1 facility. The identity of these circuits is frequently stored in a TDM facility database for tracking and management. This database contains static information and acts in a passive manner in overseeing the management of these TDM circuits. For instance, the database only stores the static information, such as circuit type and location, related to those TDM circuits but do not provide the dynamic health status of those TDM circuits.

Therefore, a need exists for a method and apparatus for monitoring and restoring TDM circuits in a packet network, e.g., a VoIP network.

SUMMARY OF THE INVENTION

In one embodiment, the present invention enables a tool for proactively managing TDM circuits used in a packet network, e.g., a VoIP network, by allowing it to instruct a program to periodically test the health of all circuits catalogued in the TDM facility database. If a circuit is found to be out of service, the present invention will trigger a maintenance action through the edge component of the VoIP network to reset the circuit and restore it to a healthy condition.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
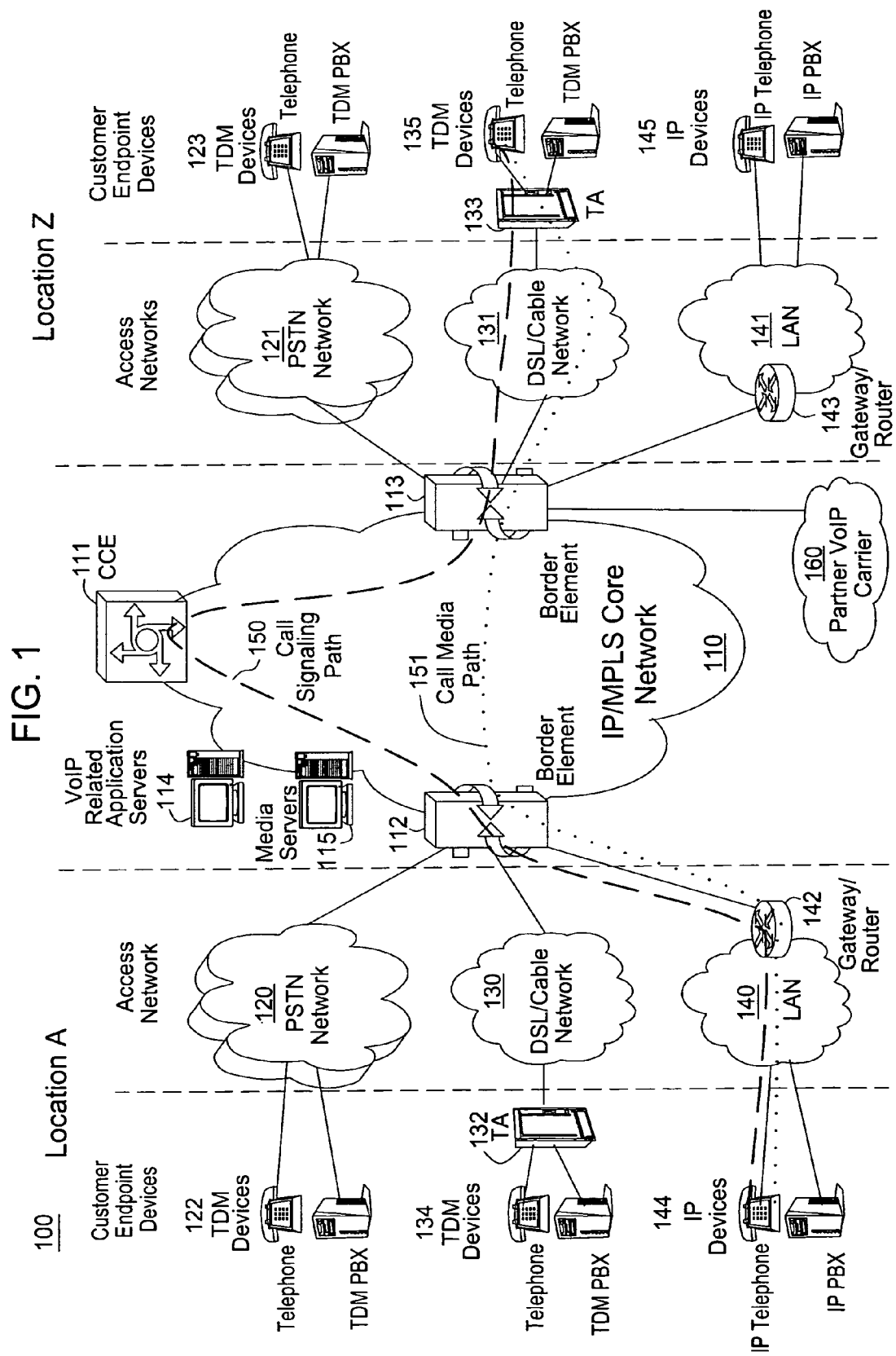
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Packet service providers, e.g., VoIP network service providers, rely on a multitude of Time Division Multiplexing (TDM) circuits to reach PSTN endpoints. These TDM circuits are in the form of voice channels, such as DS0 channels, within a T1 facility. The identity of these circuits is frequently stored in a TDM facility database for tracking and management. This database contains static information and acts in a passive manner in overseeing the management of these TDM circuits. For instance, the database only stores the static information, such as circuit type and location, related to those TDM circuits but do not provide the dynamic health status of those TDM circuits.

To address this need, the present invention enables a tool for proactively managing TDM circuits used in a packet network, e.g., a VoIP network by allowing it to instruct a program to periodically test the health of all circuits catalogued in the TDM facility database. If a circuit is found to be out of service, the present invention will trigger a maintenance action through the edge component of the VoIP network to reset the circuit and restore it to a healthy condition.

Figure 2:
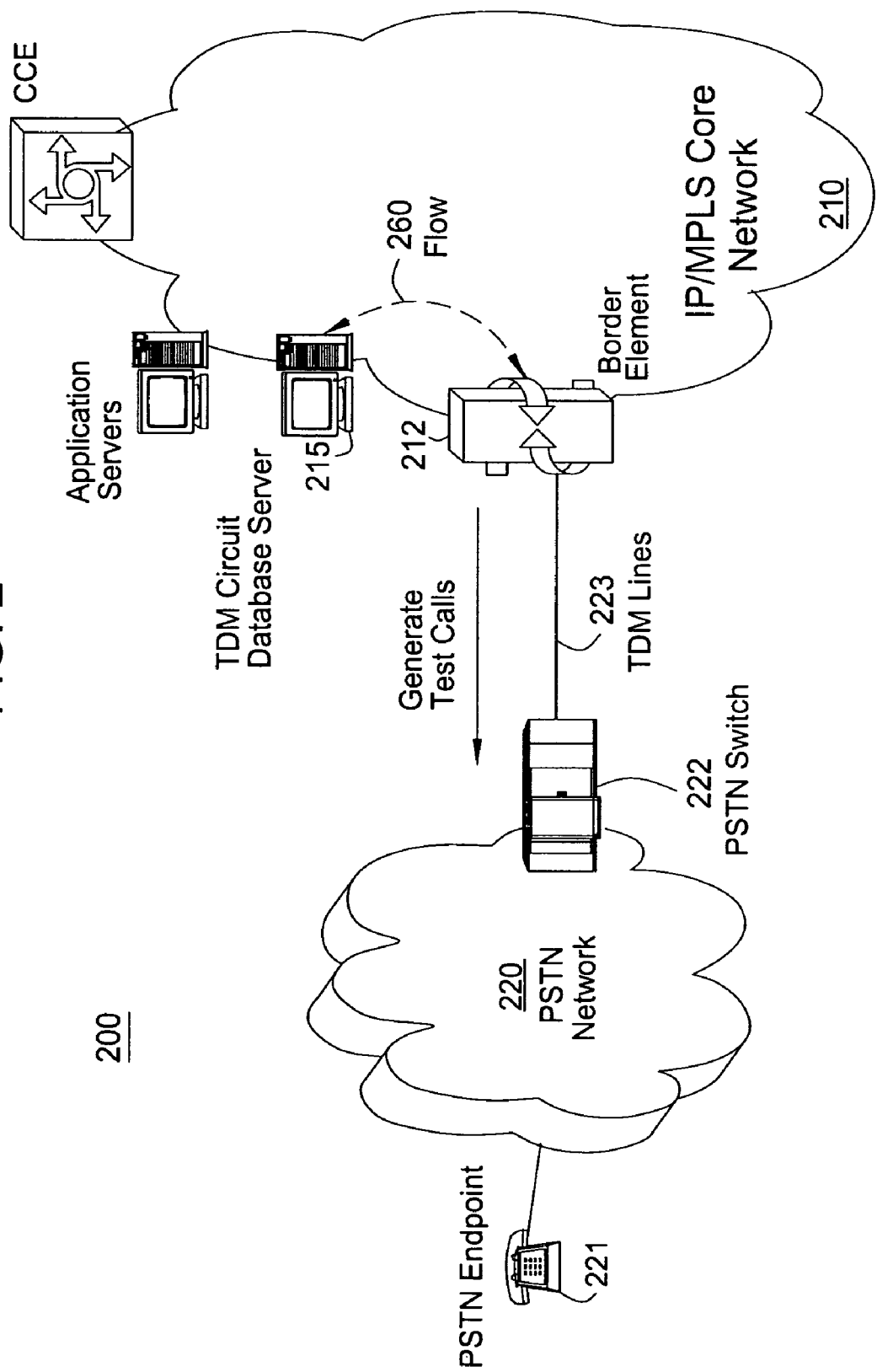
FIG. 2 illustrates an example of monitoring and restoring TDM circuits in a VoIP network related to the present invention.

FIG. 2 illustrates an exemplary communication architecture 200 for monitoring and restoring TDM circuits in a VoIP network related to the present invention. In FIG. 2, TDM circuit database server 215 catalogues all TDM circuits used by the VoIP network 210 to connect to PSTN network 220 to reach PSTN endpoint 221. Periodically, TDM circuit database server 215 sends requests to the edge component, such as BE 212, of the VoIP network to initiate testing of catalogued TDM circuits to verify the health status of these circuits using flow 260. When BE 212 receives such a request, BE 212 generates test calls over randomly chosen TDM circuits within TDM lines 223 to PSTN switch 222. If the test call is completed successfully, the tested circuit is in healthy condition. If the test call is not completed successfully, the tested circuit is in unhealthy condition. An alarm will be raised to the network operator to warn of the unhealthy TDM circuit. Then corrective actions to reset the unhealthy TDM circuit will be carried out to restore the TDM circuit to healthy condition. The TDM testing will be performed until all TDM circuits catalogued are covered and tested.

Figure 3:
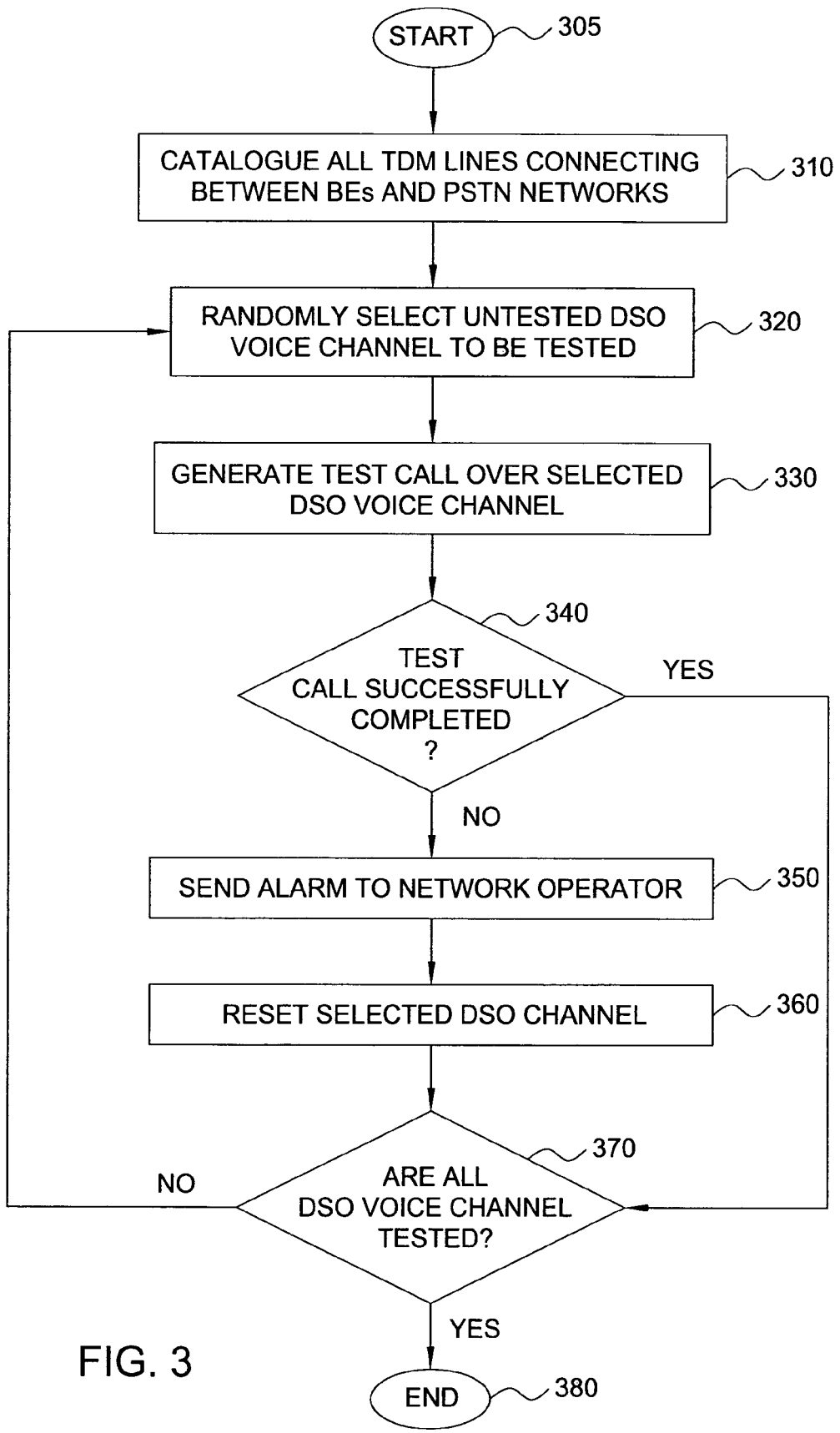
FIG. 3 illustrates a flowchart of a method for monitoring and restoring TDM circuits in a VoIP network of the present invention.

FIG. 3 illustrates a flowchart of a method 300 for monitoring and restoring TDM circuits in a packet network, e.g., a VoIP network of the present invention. Method 300 starts in step 305 and proceeds to step 310.

In step 310, the method catalogues all TDM circuits connecting between BEs in the VoIP network and PSTN switches in PSTN networks. In one embodiment, the information is stored on a TDM circuit database server.

In step 320, the method randomly selects an untested voice channel, e.g., a DS0 voice channel to be tested. It should be noted that "untested" means that it may not have been tested recently within a current cycle. Namely, once all channels have been periodically tested in a test cycle, the present invention will again starts another test cycle to test all the channels.

In step 330, the method generates a test call over the selected DS0 voice channel. It should be noted that more than one channel can be tested at the same time.

In step 340, the method checks if the test call is successfully completed. If the test call is successful, then the method proceeds to step 370; otherwise, the method proceeds to step 350. In step 350, the method sends an alarm to the network operator to indicate the tested circuit is unhealthy. In step 360, the method resets the unhealthy TDM circuit to restore it to healthy condition. In step 370, the method checks if there are remaining untested TDM circuits to be tested. If there are more TDM circuit to be tested, then the method proceeds back to step 320; otherwise, the method proceeds to step 380. The method ends in step 380.

Figure 4:
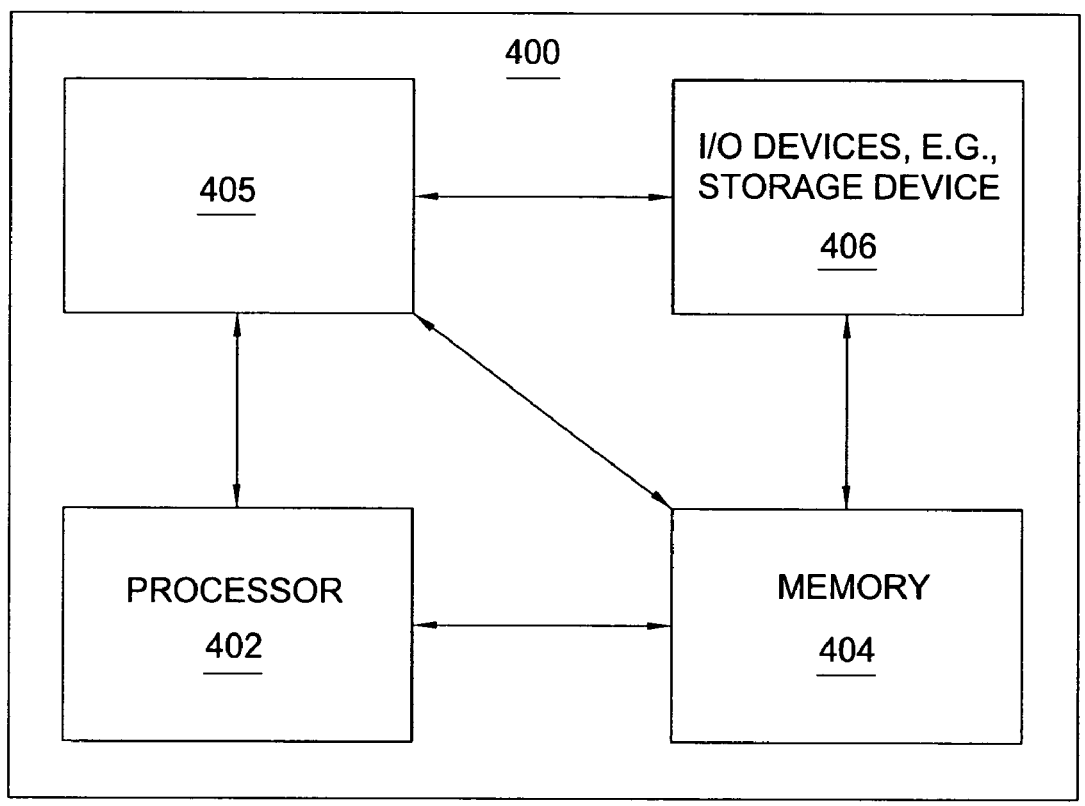
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a TDM circuits monitoring and restoring module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present TDM circuits monitoring and restoring module or process 405 can be loaded into memory 404 and executed by processor 402 to implement the functions as discussed above. As such, the present TDM circuits monitoring and restoring process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a plurality of time division multiplexing circuits connected to an internet protocol/multi-protocol label switching based core communication network, comprising:

cataloguing the plurality of time division multiplexing circuits that are connected between the internet protocol/multi-protocol label switching based core communication network and a public switched telephone network; and monitoring the plurality of time division multiplexing circuits by periodically generating a test call on one of the plurality of time division multiplexing circuits, wherein the test call is triggered by a time division multiplexing circuit database server by sending a request to a border element implemented as a media gateway that performs signaling, media control, security and call admission control functions of the internet protocol/multi-protocol label switching based core communication network, wherein the border element generates the test call over the chosen one of the time division multiplexing circuits randomly within a time division multiplexing line connected to the public switched telephone network.

2. The method of claim 1, wherein the plurality of time division multiplexing circuits are catalogued by the time division multiplexing circuit database server.

3. The method of claim 1, wherein said plurality of time division multiplexing circuits is connected between a plurality border elements in the internet protocol/multi-protocol label switching based core communication network and a plurality of public switched telephone network switches in the public switched telephone network.

4. The method of claim 1, further comprising:
sending an alarm to a network operator if the test call is not successfully completed; and
resetting the one of the plurality of time division multiplexing circuits to restore the one circuit to a healthy state.

5. The method of claim 1, wherein the catalogued time division multiplexing circuits are DS0 voice channels.

6. A non-transitory computer-readable medium having stored thereon a plurality of instructions, the plurality of instructions including instructions which, when executed by a processor, cause the processor to perform a method for monitoring a plurality of time division multiplexing circuits connected to an internet protocol/multi-protocol label switching based core communication network, comprising:

cataloguing the plurality of time division multiplexing circuits that are connected between the internet protocol/multi-protocol label switching based core communication network and a public switched telephone network; and monitoring the plurality of time division multiplexing circuits by periodically generating a test call on one of the plurality of time division multiplexing circuits, wherein the test call is triggered by a time division multiplexing circuit database server by sending a request to a border element implemented as a media gateway that performs signaling, media control, security and call admission control functions of the internet protocol/multi-protocol label switching based core communication network, wherein the border element generates the test call over the chosen one of the time division multiplexing circuits randomly within a time division multiplexing line connected to the public switched telephone network.

7. The computer-readable medium of claim 6, wherein the plurality of time division multiplexing circuits are catalogued by the time division multiplexing circuit database server.

8. The computer-readable medium of claim 6, wherein said plurality of time division multiplexing circuits is connected between a plurality border elements in the communication network and a plurality of public switched telephone network switches in the public switched telephone network.

9. The computer-readable medium of claim 6, further comprising:
sending an alarm to a network operator if the test call is not successfully completed; and
resetting the one of the plurality of time division multiplexing circuits to restore the one circuit to a healthy state.

10. The computer-readable medium of claim 6, wherein the catalogued time division multiplexing circuits are DS0 voice channels.

11. An apparatus for monitoring a plurality of time division multiplexing circuits connected to an internet protocol/multi-protocol label switching based core communication network, comprising:

means for cataloguing the plurality of time division multiplexing circuits that are connected between the internet protocol/multi-protocol label switching based core communication network and a public switched telephone network; and means for monitoring the plurality of time division multiplexing circuits by periodically generating a test call on one of the plurality of time division multiplexing circuits, wherein the test call is triggered by a time division multiplexing circuit database server by sending a request to means for monitoring implemented as a media gateway that performs signaling, media control, security and call admission control functions of the internet protocol/multi-protocol label switching based core communication network, wherein the means for monitoring generates the test call over the chosen one of the time division multiplexing circuits randomly within a time division multiplexing line connected to the public switched telephone network.

12. The apparatus of claim 11, wherein the time division multiplexing circuits are catalogued by the time division multiplexing circuit database server.

* * * * *